(12) United States Patent
Lin

(10) Patent No.: US 7,680,492 B2
(45) Date of Patent: Mar. 16, 2010

(54) WIRELESS COMMUNICATION DATABASE MANAGEMENT

(75) Inventor: Wen-Pin Lin, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 881 days.

(21) Appl. No.: 11/391,081

(22) Filed: Mar. 28, 2006

(65) Prior Publication Data

US 2007/0240196 A1 Oct. 11, 2007

(51) Int. Cl.
*H04M 3/00* (2006.01)
(52) U.S. Cl. .............................. 455/418; 726/27; 726/30
(58) Field of Classification Search ................. 455/403, 455/410, 418, 414.1; 726/27, 30, 1, 4, 6, 726/26
See application file for complete search history.

(56) References Cited

U.S. PATENT DOCUMENTS 6,883,105 B2* 4/2005 Dutton ....................... 713/323
2005/0286422 A1* 12/2005 Funato ........................ 370/235
2006/0265760 A1* 11/2006 Daemke et al. ............... 726/27

* cited by examiner

*Primary Examiner*—CongVan Tran
(74) *Attorney, Agent, or Firm*—Carlson, Gaskey & Olds PC

(57) ABSTRACT

A technique for updating and maintaining a wireless communication database (40) includes several features. One feature is a search capability that facilitates, for example, an individual locating appropriate portions of the database to be updated in a desired manner. A platinum data image portion includes a relational database regarding various rules governing the contents of the wireless communication database. If a proposed change will violate any of these rules, an error message is provided. If a proposed change is acceptable, it will be implemented on an automated basis. A disclosed example includes the capability of scheduling proposed changes into the future, indicating a proposed change for one particular data field and instructing an automated update of all similar or related data fields in a particular manner.

20 Claims, 2 Drawing Sheets

WIRELESS COMMUNICATION DATABASE MANAGEMENT

FIELD OF THE INVENTION

This invention generally relates to communication. More particularly, this invention relates to wireless communications.

DESCRIPTION OF THE RELATED ART

Wireless communication systems are well known and in widespread use. Typical arrangements include a variety of network components and equipment for facilitating wireless communications on behalf of mobile subscribers. Typical arrangements include a plurality of base station transceivers geographically positioned to provide wireless communication coverage in desired areas. Control equipment such as a radio network controller facilitates communication between the base station transceivers and a wireless network that includes a plurality of known components.

Typical wireless communication arrangements include a database that is used for controlling and facilitating operation of a variety of the system components. Wireless communication databases are typically very complex. Consider, for example, a communication system that includes an executive cellular processor that is associated with 300 cells, each having three carriers with three sectors per carrier. Each such executive cellular processor will typically have more than 1500 fields of data within the database that need to be populated and updated to provide desired system performance. A service provider that has 200 operating executive cellular processors must maintain more than 30,000 data fields to ensure proper operation and to provide a desired level of wireless service.

In addition to the challenges presented by the large volume of data, a wireless communication database typically is arranged into forms that have various pages with each page having various fields. One challenge associated with using such a database is presented to a technician who has to locate particular data fields for updating the data, for example. Not only must the technician be able to find the appropriate form, page and field, but they must also be able to ensure that any changes made to them will not adversely affect system operation. Moreover, it is extremely difficult for a technician to be able to predict whether a change made to one portion of the database will have a negative impact on another portion of the database.

There are costs associated with the time and difficulty presented when trying to update and maintain a wireless communication database. Troubleshooting is particularly difficult if system performance is reduced because of database errors.

There is a need for a technique to facilitate wireless communication database management that simplifies the task of a technician when interacting with the database and facilitates better control over the contents of the database.

This invention addresses those needs and provides a unique approach to database management.

SUMMARY OF THE INVENTION

An exemplary method of managing a wireless communication database that is used to control wireless communication equipment includes establishing a plurality of rules regarding a plurality of portions of the wireless communication database. The rules place restrictions on contents of the database. The rules are configured to facilitate proper operation of the wireless communication equipment. Automatically determining whether a proposed change to the wireless communication database will violate at least one of the plurality of rules and automatically implementing the proposed change if none of the plurality of rules will be violated by the proposed change facilitates database management.

One example includes determining at least one category of data within the database that will be affected by the proposed change and determining whether the proposed change will violate any of the plurality of rules that applies to the determined category of data.

Another example includes automatically determining the at least one category directly from the proposed change. One example includes automatically determining whether there is at least one other category based upon a relationship between the at least one category and some known relationship between data in that category and other categories of data within the database. Automatically determining whether the proposed change will violate any of the plurality of rules that applies to the other category further facilitates database management.

One example includes the ability to schedule a database change at a future time or at selected intervals. Such changes will be automatically implemented according to the desired schedule provided that the changes will not violate any of the established rules.

One example includes automatically determining if a proposed change will violate one of the established rules and providing a corresponding notification. One example includes only implementing a change if the proposed rules are not violated. Another example allows for overriding the established rules by implementing a proposed change but providing a notification regarding the rule violation for troubleshooting or verification purposes.

The various features and advantages of this invention will become apparent to those skilled in the art from the following detailed description. The drawings that accompany the detailed description can be briefly described as follows.

DETAILED DESCRIPTION

This invention provides a technique for managing a database such as a wireless communication database. An example embodiment is described below that utilizes an established plurality of rules regarding various portions of the database. The disclosed example includes automatically determining whether a proposed change to the database will violate at least one of the plurality of rules. The disclosed example facilitates automatically implementing a proposed change if none of the rules will be violated.

Figure 1:
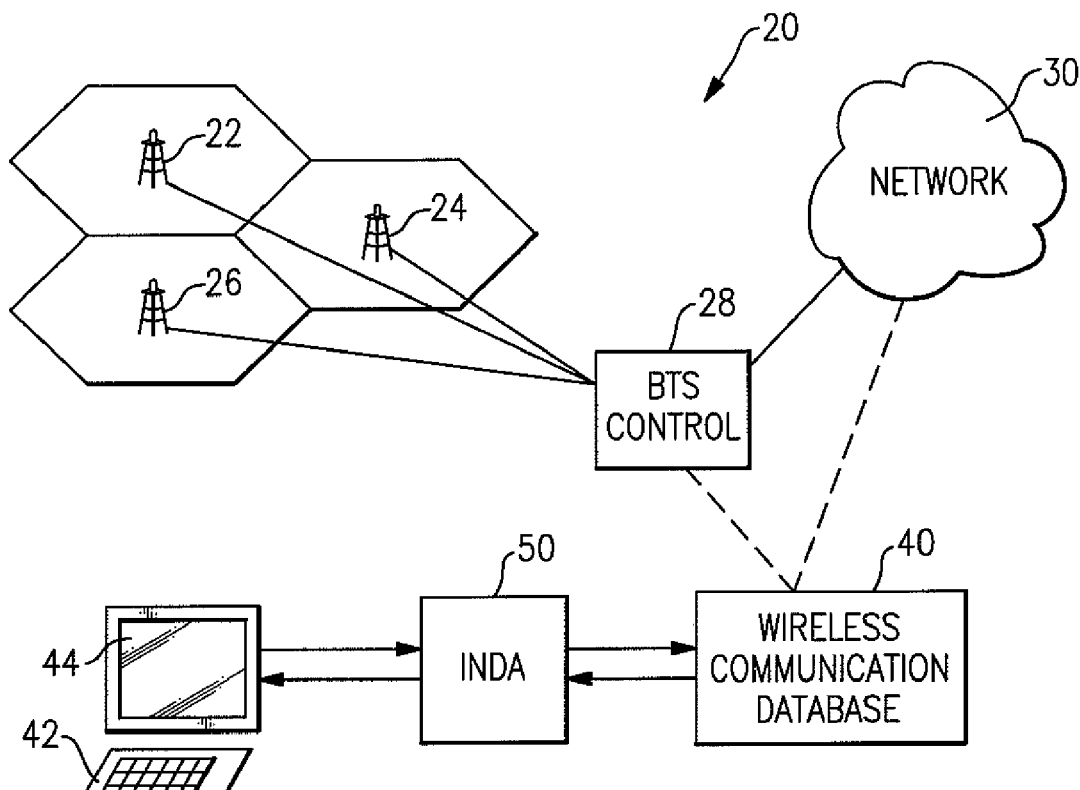
FIG. 1 schematically shows selected portions of a wireless communication system that is useful with an embodiment of this invention.

FIG. 1 schematically shows selected portions of a wireless communication system 20. Base station transceivers 22, 24 and 26 provide wireless communication coverage over geographic regions commonly referred to as cells. A base station control device 28 such as an executive cellular processor or a radio network controller, depending on the particular implementation, controls and facilitates communications between the base stations 22-26 and a wireless communication network 30. As known, there are a variety of components and different kinds of equipment involved in the various portions of the wireless communication system 20.

The illustrated example includes a wireless communication database 40 that includes a plurality of types of data or information that is used for operating the wireless communication system 20. Different control parameters and operating software may be maintained in the wireless communication database 40. An authorized person or technician can access the database 40 using a computer, for example, having an input portion 42 and a display portion 44. Prior to this invention, such an individual would interact directly with the database 40 and it was up to the individual to locate any relevant portions of the database and to ensure the integrity and accuracy of the database.

As schematically shown in FIG. 1, an intelligent network database assistance portion (INDA) 50 provides an interface between the wireless communication database 40 and a technician or other individual accessing the database. The INDA 50 facilitates more efficient and economical use of the database 40 and provides management functions for maintaining the database in a manner that provides improved reliability of the database contents and operation of the wireless communication system 20.

Figure 2:
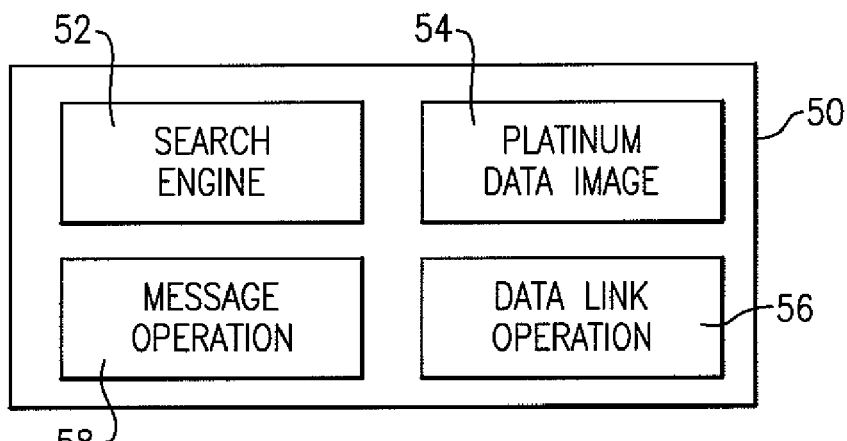
FIG. 2 schematically shows an example intelligent network database assistance arrangement designed according to an embodiment of this invention.

FIG. 2 schematically shows an example embodiment of the INDA 50. This example includes a search engine portion 52. Providing search capabilities for accessing the database 40 facilitates an individual's ability to locate relevant portions of the database when updating values or troubleshooting, for example. In one example, the search engine portion 52 uses known content recognition techniques, for example, for locating relevant portions of the database.

In some examples, the search engine portion 52 is capable of detecting particular types of data fields, that are preconfigured according to the needs of a particular situation and the particular contents of the database 40. In such situations, the search engine portion 52 can be configured to perform specific search operations responsive to particular requests or input from a user. For example, the search engine portion 52 can automatically locate all data fields relevant to a base station output power level responsive to a corresponding inquiry from a user. Given this description, those skilled in the art will be able to program a suitable search engine portion 52 to meet the needs of their particular situation while realizing the results provided by the described example embodiment.

Another portion of the INDA 50 of FIG. 2 is a platinum data image portion (PDI) 54. This example PDI 54 has at least three primary capabilities. The PDI 54 provides information that an authorized user will need by coordinating with the search engine portion 52. The example PDI 54 includes a table that provides network configuration data and associated definitions (e.g., cell type, cell sector size, pilot detection threshold, search window size, etc.).

The example PDI 54 also provides all data values of all data network devices, the vendor suggested values associated with such devices and similar information. This feature allows the PDI 54 to assist users while they are updating the data in the database 40, for example.

Another feature of the PDI 54 is that it can perform a check to determine whether a proposed change to the database 40 is appropriate. A set of established rules governs acceptable content and changes, in one example. When permissible, the PDI 54 facilitates automatically making such changes immediately responsive to a user's request or on a scheduled basis, where preset times are provided by a user.

Example rules governing the contents of the wireless communication database 40 may include preset values or ranges for values. For example, a 20 watt output power may be recommended for daytime hours with an 18 watt output power recommended for nighttime hours for particular cells. The rules may allow a range around each of these numbers and require confirmation of the time during which a particular output power will be implemented. If a proposed change to the wireless communication database 40 includes setting an output power for one of these cells to an inappropriate value, for a particular time of day or night, that would violate the rule and be a proposed change that may not or will not be implemented, depending on the scenario.

Another feature of the example PDI 54 is that it facilitates sending a message regarding changes made to the database, errors in the database as a result of a proposed change or other information that may be useful for troubleshooting, for example.

The example PDI 54 includes a relational database that facilitates determining what portions of the wireless communication database 40 are related to each other because of similar properties of their data field or an interactive use of the corresponding data during system operation, for example. Given this description and the contents of a particular database, those skilled in the art will be able to establish appropriate relationships and to configure a platinum data image portion 54 for their particular implementation to meet their particular needs.

The example INDA 50 also includes a data link operation portion (DLO) 56. A primary function of the example DLO 56 is to connect to the wireless communication database 40 to facilitate actual changes and searches involving the contents of the database 40. The DLO 56 scans the database 40 and uses the data link relations provided by the PDI 54 for making determinations whether proposed changes will cause problems or be in error and to confirm that the contents of the wireless communication database 40 are within the established rules.

Another feature of the INDA 50 of FIG. 2 is a message operation portion 58. Messages to a user may provide updates or warnings, for example. Whenever the INDA 50 determines that a proposed change suggested by a user will result in an error, the message operation portion 58 facilitates notifying that user regarding the error. In one example, the message can be instantly provided on the display screen 44. If the user is no longer on line, the message operation portion 58 in one example facilitates sending an email or a short message service notification to a user or authorized individual. The message operation portion 58 in one example also provides notifications regarding troubleshooting information that may be useful under certain circumstances.

The various portions of the example INDA 50 are schematically divided for discussion purposes. Each may include or use software or hardware that is used by another portion. In one example, the entire INDA 50 comprises software, The software is stored on a computer readable medium.

Figure 3:
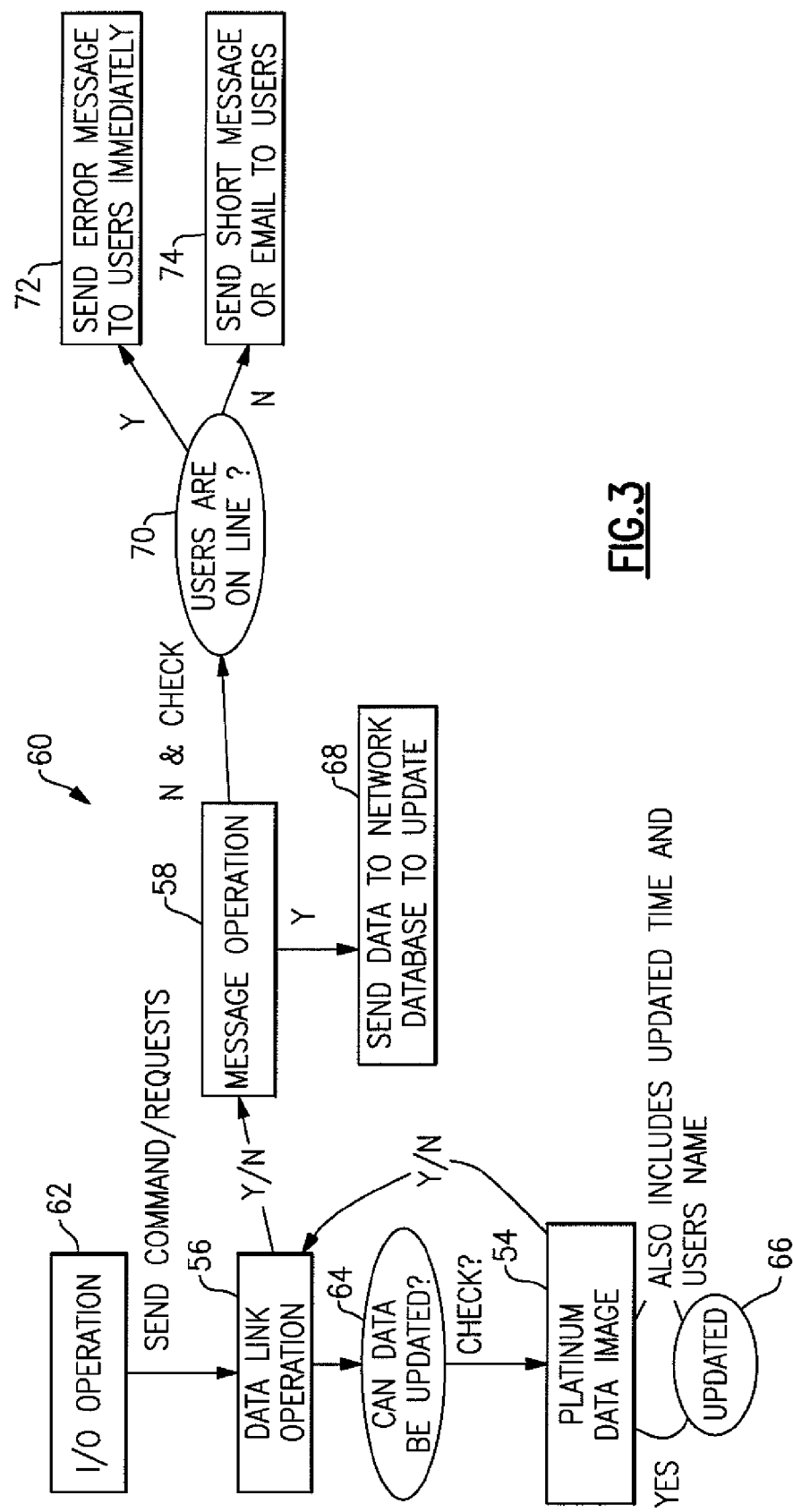
FIG. 3 schematically illustrates an example procedure used with an embodiment of this invention.

FIG. 3 includes a flow diagram 60 showing one example use of an example embodiment. At 62, user input includes a proposed change to at least a portion of the wireless communication database 40. The DLO portion 56 receives the request and communicates with the PDI 54 as schematically shown at 64 for making a determination whether the proposed change can be implemented. The PDI 54 checks the relational database already provided for the PDI 54 and determines whether any of the plurality of rules set for the wireless communication database 40 would be violated by the proposed change. In this example, the PDI 54 uses information regarding at least one characteristic of the data field involved in the proposed change for determining which rules to consider and which portions of the relational database are implicated by the proposed change. In this example, at 66, a determination is made that the proposed change is acceptable and can be implemented. This information is then communicated back to the DLO portion 56.

In this example, the proposed change is acceptable and the new data is provided to the wireless communication database 40 as schematically shown at 68.

In one example, the communication schematically shown at 62 includes an indication of one particular type of data field within the database 40. The DLO portion 56 and the PDI portion 54 cooperate for making a determination regarding all other portions of the database having a similar characteristic as the identified data field. The DLO portion 56 in this example determines all other data fields corresponding to the one indicated in the communication at 62 and provides such information to the user.

In one example, the user will indicate a proposed change to one data field and provide instruction for all similarly situated data fields to be updated in a similar manner (e.g., to contain an identical value). The search engine portion 52, the PDI portion 54 and the DLO portion 56 facilitate automatically identifying all relevant portions of the wireless communication database 40 and automatically making the proposed change in each of those data fields or portions of the database. This presents a significant improvement over previous situations where an individual had to manually locate each individual data field and make the proposed change to each one. Not only is there a tremendous time savings with the example embodiment but there also is better accuracy as human entry error over a repeated process can be eliminated.

The example implementation also provides the ability to set future times for data changes to be made. The PDI 54 in one example has a clock feature that allows an individual to set a time or multiple times in the future for changing data. The PDI 54 then uses the automated, scheduled data update to maintain or update the wireless communication database 40 according to the instructions of the user.

One feature of the disclosed example is that the PDI 54 maintains a record of all changes that have been made to the database, who they were authorized by and what the resulting changes were. This information greatly facilitates troubleshooting in the event of problems or errors with the database 40 or operation of the communication system 20.

Referring again to FIG. 3, assume that a proposed change is not acceptable because it would place a control parameter outside of a range specified by the database provider, equipment provider or a wireless service provider, for example. Any one of such entities may establish one or more rules governing the contents of the database 40. In the event that a proposed change cannot be made, the DLO portion 56 notifies the message operation portion 58. Then a determination is made at 70 whether the individual or authorized person is online communicating with the INDA 50. If so, an error message is immediately sent at 72 to notify that individual that a proposed change should not be implemented. In the event that the person is not currently communicating with the INDA 50, a short message service format message or an email can be sent to the individual at 74. In this example, the message operation portion 58 is capable of communicating with a short message center associated with the communication system 20 for delivering short messages to appropriate mobile stations.

In one example, whenever a proposed change will violate one or more of the rules governing the database 40, that change will not be automatically implemented, but instead a message regarding the problem with the proposed change will be provided. That can be overridden by an appropriately authorized individual who is making a change to the database that may conflict with an out-of-date rule governing the database. This feature may be useful, for example, in situations where a particular change may be needed on a temporary basis or may be desirable because of some update to the equipment associated with the wireless communication system 20. One example includes an ability to alter the rules governing the contents of the database by changing appropriate information in the PDI 54 or another storage location that includes an indication of the plurality of rules.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of managing a wireless communication database that is used to control wireless communication equipment, comprising:
    establishing a plurality of rules regarding a plurality of portions of the wireless communication database, wherein the rules govern content of the database and are configured to facilitate proper operation of the wireless communication equipment;
    automatically determining whether a proposed change to the wireless communication database will violate at least one of the plurality of rules; and
    automatically implementing the proposed change if none of the plurality of rules will be violated by the proposed change.

2. The method of claim 1, comprising
    determining at least one category of data within the database that will be affected by the proposed change; and
    determining whether the proposed change will violate any of the plurality of rules that applies to the determined at least one category of data.

3. The method of claim 2, comprising
    automatically determining the at least one category directly from the proposed change;
    automatically determining whether there is at least one other category from a relationship between the at least one category of data in the at least one category and other categories of data in the database; and
    automatically determining whether the proposed change will violate any of the plurality of rules that applies to the at least one other category.

4. The method of claim 1, comprising
    providing an indication that the proposed change will violate at least one of the plurality of rules.

5. The method of claim 4, comprising
    providing the notification by sending at least one of an email notification or a short message notification.

6. The method of claim 1, wherein the plurality of rules are established by at least one of a provider of the database, a provider of the wireless communication equipment or a service provider that provides wireless communication services that include operation of at least a portion of the wireless communication equipment.

7. The method of claim 1, comprising
    allowing the proposed change to have a future scheduled time for implementation that is selectable by a user; and automatically implementing the proposed change at the scheduled time.

8. The method of claim 1, comprising
tracking an identity of a user requesting the proposed change and a time at which the proposed change is implemented.

9. The method of claim 1, wherein the proposed change is directed to a first portion of the database and the method comprises
determining whether a corresponding change is desired for at least one related portion of the database; and
automatically implementing the corresponding change for the at least one related portion of the database.

10. The method of claim 1, comprising
receiving an indication of a proposed change with at least some indication of a possible portion of the database to which the proposed change applies;
automatically determining at least one portion of the database based on the indication; and at least one of
automatically applying the proposed change to the at least one portion, or
automatically providing an indication of the at least one portion.

11. A computer readable storage medium containing computer-executable instructions useful for managing a wireless communication database that is used to control wireless communication equipment, comprising: instructions for establishing a plurality of rules regarding a plurality of portions of the wireless communication database, wherein the rules govern content of the database and are configured to facilitate proper operation of the wireless communication equipment; instructions for automatically determining whether a proposed change to the wireless communication database will violate at least one of the plurality of rules; and instructions for automatically implementing the proposed change if none of the plurality of rules will be violated by the proposed change.

12. The computer readable storage medium of claim 11, comprising instructions for determining at least one category of data within the database that will be affected by the proposed change; and instructions for determining whether the proposed change will violate any of the plurality of rules that applies to the determined at least one category of data.

13. The computer readable storage medium of claim 12, comprising instructions for automatically determining the at least one category directly from the proposed change; instructions for automatically determining whether there is at least one other category from a relationship between the at least one category of data in the at least one category and other categories of data in the database; and instructions for automatically determining whether the proposed change will violate any of the plurality of rules that applies to the at least one other category.

14. The computer readable storage medium of claim 11, comprising instructions for providing an indication that the proposed change will violate at least one of the plurality of rules.

15. The computer readable storage medium of claim 14, comprising instructions for providing the notification by sending at least one of an email notification or a short message notification.

16. The computer readable storage medium of claim 11, wherein the plurality of rules are established by at least one of a provider of the database, a provider of the wireless communication equipment or a service provider that provides wireless communication services that include operation of at least a portion of the wireless communication equipment.

17. The computer readable storage medium of claim 11, comprising instructions for allowing the proposed change to have a future scheduled time for implementation that is selectable by a user; and instructions for automatically implementing the proposed change at the schedule time.

18. The computer readable storage medium of claim 11, comprising instructions for tracking an identity of a user requesting the proposed change and a time at which the proposed change is implemented.

19. The computer readable storage medium of claim 11, wherein the proposed change is directed to a first portion of the database and comprising instructions for determining whether a corresponding change is desired for at least one related portion of the data base; and instructions for automatically implementing the corresponding change for the at least one related portion of the database.

20. The computer readable storage medium of claim 11, comprising instructions for receiving an indication of a proposed change with at least some indication of a possible portion of the database to which the proposed change applies; instructions for automatically determining at least one portion of the database based on the indication; and at least one of instructions for automatically applying the proposed change to the at least one portion, or instructions for automatically providing an indication of the at least one portion.

* * * * *